W. FOWLER.

MACHINE FOR MAKING INSOLES.

APPLICATION FILED AUG. 14, 1916.

Reissued Nov. 21, 1916.

14,217.

2 SHEETS—SHEET 1.

Inventor

William Fowler

Witnesses

C. B. Foster

L. a. Beck

By Wood & Wood

Attorneys

W. FOWLER.

MACHINE FOR MAKING INSOLES.

APPLICATION FILED AUG. 14, 1916.

Reissued Nov. 21, 1916.

14,217

2 SHEETS—SHEET 2.

Inventor

William Fowler

Witnesses

C. H. Pratt

L. A. Beck

By

Wood & Woods

Attorneys

UNITED STATES PATENT OFFICE.

WILLIAM FOWLER, OF CINCINNATI, OHIO, ASSIGNOR OF ONE-HALF TO CHARLES H. KRIPPENDORF, OF CINCINNATI, OHIO.

MACHINE FOR MAKING INSOLES.

14,217. Specification of Reissued Letters Patent. Reissued Nov. 21, 1916.

Original No. 1,146,789, dated July 20, 1915, Serial No. 827,566, filed March 27, 1914. Application for reissue filed August 14, 1916. Serial No. 114,940.

*To all whom it may concern:*

Be it known that I, WILLIAM FOWLER, a citizen of the United States, and a resident of the city of Cincinnati, in the county of Hamilton and State of Ohio, have invented certain new and useful Improvements in Machines for Making Insoles, of which the following is a full, clear, and exact description, reference being had to the accompanying drawings, forming a part of this specification.

The object of the invention is to provide a machine for turning up and pressing together the lips of a double lip insole. The insole is cut before being fed to the machine, to form the two opposed lips and rubber cement is preferably applied to the lips before the sole is put into the machine. The purpose of the machine is to raise these lips to a perpendicular position on the insole, and to press them together, to form a strong and secure rib for sewing the insole to the shoe upper.

Another object of the invention is to provide a combined lip turning and setting tool having a projecting toe portion shaped to form a plow for raising a lip angularly to a base and a heel portion constituting a hammer, for imparting blows delivered in rapid succession against the lip as raised against an anvil or abutment opposite the hammer, so that the lip will assume a permanent set in its angular position or for raising and compressing the lip against a second lip in uniting two lips together by cement and pressure to form a single compound stitch receiving lip around the shank and fore part of the body portion of an insole The objects are accomplished and various other advantages, such as simplicity, great efficiency and ease of operation, are obtained by that certain construction and arrangement of parts to be hereinafter specifically pointed out and claimed.

Figure 1:
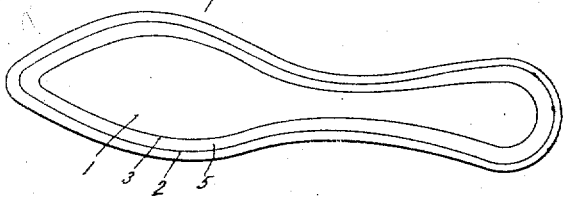
Figure 2:
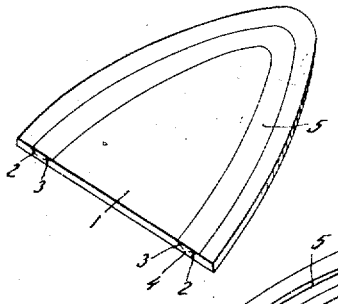
Figure 3:
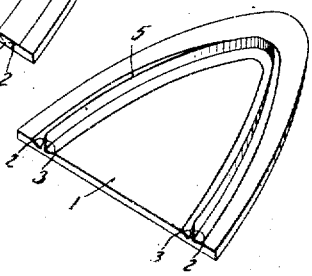
Figure 4:
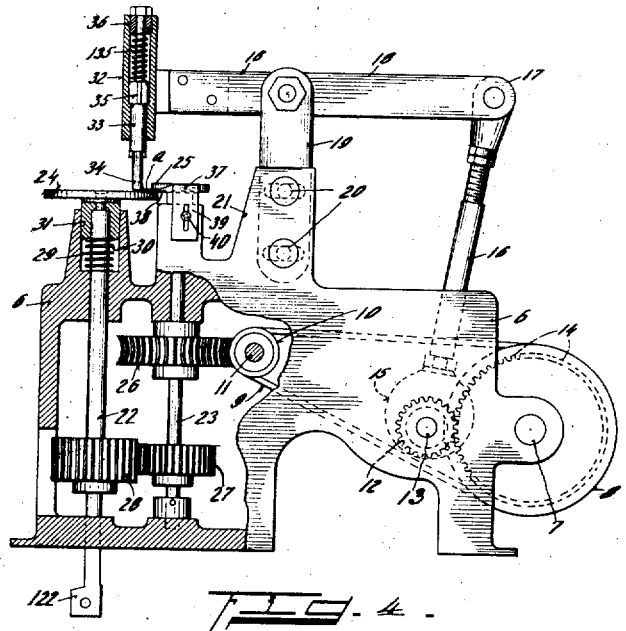
Figure 5:
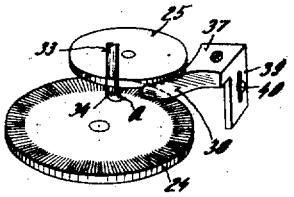
Figure 6:
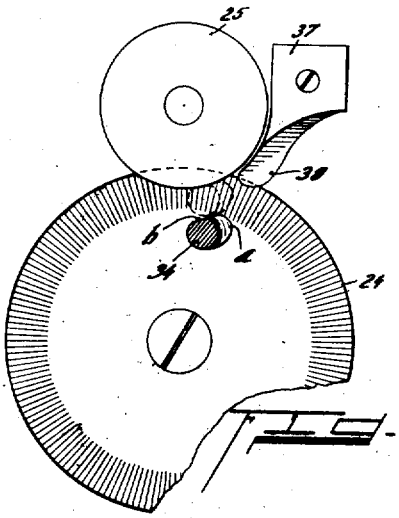

In the drawings, Figure 1 is an insole with the double cuts formed therein. Fig. 2 is a cross section of the toe thereof. Fig. 3 is a similar view to Fig. 2, after the parts have passed through the machine. Fig. 4 is a longitudinal vertical section of the machine with the driving parts in elevation. Fig. 5 is a detail perspective view of the lip turning means. Fig. 6 is a plan view of the parts shown in Fig. 5.

The machine is adapted to operate upon insoles of various types to raise one or more lips angular to the body of the insole, and in particular to operate upon an insole, the blank of which has been previously split and slitted around the margin of the shank and fore part, or otherwise constructed, to form two opposite lips to be bent up by the machine at right angles to the body portion of the insole and united by cement to form a single stitch-receiving lip and leaving an edge known as a feather outside of the lip and around the same. The side of the insole from which the lip projects, including the lip in raised position and feather, is frequently covered by a reinforcing cover usually of cotton duck or canvas, adhesively united and sometimes additionally secured by stitching.

In the type of product herein illustrated the insole 1 is prepared for the machine by making two cuts or channels 2 and 3 around the insole surface. The free ribbon of leather 5 so formed remains attached to the insole by the uncut portion 4. Rubber cement is then preferably applied to the ribbon-like strip 5, and the insole is ready to be fed into the lip turning machine. When the insole comes out of the machine, it will have the edges at each side of the ribbon bent up, pressed together and held by the rubber cement, which raised or bent up portions will remain in their erect position and form a flap for sewing the insole to the other parts of the shoe.

The machine which is the embodiment of this invention comprises a framework 6, having suitable journals for a driving shaft 7. A gear 12 on a shaft 13 (similarly mounted) meshes with a gear 14 on this shaft 7. An eccentric 15 on the shaft 13 has a rod 16, pivoted in the end 17 of a lever or walking beam 18. This walking beam is fulcrumed in the standards 19 and its forward end carries one of the lip turning tools. The standards 19 are slotted for lateral adjustment and secured by bolts 20 to lugs 21 on the framework.

Located at the forward end of the machine are two vertical shafts 22 and 23, which carry on their upper ends the knurled disks 24 and 25 respectively. The disk 24 is the revolving table upon which the insole is placed to be worked upon, and the disk 25 is the feed and anvil roll, which holds the insole on the revolving table, revolves in the opposite direction to the table and whose edge overlaps the edge of the table disk 25 and forms a vertical abutment against which the two lips are pressed together, by the tool mounted on the lever 18 to be hereinafter described.

The shaft 23 has a gear 26 which meshes with a worm on a shaft 11 mounted horizontally in the framework. A pulley 10 on this shaft is driven by a belt 9 which also passes over a larger pulley 8 on the driving shaft 7. When the driving shaft is turned the shaft 23 will then turn also imparting revolution to the lip roll disk 25. A gear 27 on the shaft 23 meshes with a gear 28 on the shaft 22 for the revolving table 24. This gear should be wide enough to change position with relation to the gear 27, because the shaft 22 is to be lowered by the saddle 122 connected to a foot treadle (not shown) so that the insole may be fed to or released from contact with the two disks 24 and 25. A socket 29 formed in the framework is provided to receive the sleeve 31 by means of which the revolving table 24 is secured to the shaft 22, and a spring 30 is seated in the socket, around the shaft 22, to return the parts to operating position when downward pressure is released. This spring also gives resiliency to the support of an insole by the table, and the table thus adapts itself automatically to unevenness or different thickness of material to be operated on.

On the end of the lever 18 over the table 24 is secured a socket head 32. Within this socket head is mounted the spindle 33 of a lip turning tool 34. A collar 35 is mounted on the spindle and a spring 135 is placed within the socket head to bear between this collar and a plug 36 in the end of the head. A plow or lip raising piece 37 is provided to work in connection with the lip roll. It has a beveled and sharpened edge 38 which raises the outer lip of the insole and is adjustably mounted alongside of the feed roll, by a slotted plate 39 and bolt 40.

The tool 34 may be referred to as one of a compound character having a toe portion *a* and a heel or hammer portion *b*, as more clearly illustrated in Fig. 6, and these portions occupy or are disposed in a particular relation to the anvil or feed roll 25 and as to the direction of work feed. The toe portion as a plow, projects from the shank of the tool in a direction approximately corresponding to a line tangent to the periphery of the feed roll, with a slight tendency toward the anvil surface of the feed roll, and tapering or inclined from its toe edge upwardly from its base toward the shank. It is appropriately shaped and projects so that its toe edge advancely engages with the channel slit 3 of the insole in its reciprocating or vibratory motion toward and from the feed roll 25, and through its rapid motion and feed of the work forcibly and guidingly raises the lip angularly to the base. The work under such compound lip-raising influences can be fed very rapidly, and the lip raised to a position to be operated upon by the heel or hammer portion of the tool 25.

The incline or taper of the toe portion rearwardly develops into the flat side wall or face of the heel or hammer portion *b* of the tool adjacent the anvil surface of the feed roll 25 so as to forcibly compress together the two lips of the insole fed between the hammer and feed-roll to form the single upstanding lip. The side hammer wall and end or bottom of the tool are at such an angle as to engage well into the angle formed by the lip and body of the insole for compactly beating the lip at such angle portion to destroy its flexible texture to prevent receding. It will also be observed from Fig. 6 that the hammer portion of the tool is placed at one side and forward of a diametric line through the axes of the table and feed rolls, and therefor, the hammer compresses the lip on the feed run of the periphery of the feed roll, with the feed roll in its rotation assisting in crowding the lip toward the hammer.

The tool, being slidably mounted in the head bearing and yielding toward the face of the table roll, qualifies as a presser foot for gripping the insole within the lip and forcing the same against the surface of the rotatable work support, and thus the tool in its reciprocating or vibratory hammer action moves in an arc or incline under a downward spring pressure toward the angle formed by the lip and body of the insole, which pressure increases as the tool is swung about a pivot toward the feed roll. The yielding motion of the tool also accommodates for any inequalities in the thickness of the insole and for different thicknesses of insole. The toe portion of the tool also serves as a guard when tracking around the toe portion of the insole by engaging the base of the lip and providing a fulcrum upon which the insole is turned for finishing the second half of the lip, in which the insole may be said to be fed in an alternate or return direction as in a direction from the toe to the heel of the insole. The face of the feed roll is approximately equal in width to the height of the upstanding lip of the insole so as to support the lip from its edge to its connection with the body of the insole so that the entire lip area is operated upon.

As thus described, the operation of my machine is as follows: The driving shaft is started, the table lowered and the heel of an insole placed on the table and positioned to bring the feather beneath the feed roll, and the stationary plow or turning tool 37 engaged into the outer lip channel. The downward pressure is then released and the sole allowed to travel. The plow 37 will lift the outer lip of the insole, so that it stands vertically engaging the edge of the feed roll. The tool 34 is used to hold the insole upon the rotatable table 24, and in its vibratory or reciprocatory motion, engage its plow toe portion into the channel slit underneath the flat lip and together with the feeding motion of the insole raise the lip to a position angular to the body of the insole, presenting the lip in an upstanding position to the hammer face of the tool, which compresses the lip and a second lip against the rotatable abutment or anvil roll, pressing the two lips together to form a single lip. The operator has merely to guide the insole, as would be done in a channeling machine, and the insole comes out of the machine with a vertical double lip, which is the desired result.

The fact that the vibrating lip turning tool is resiliently mounted on a walking beam gives a clawing movement to it. This diagonal or clawing motion sends the tool under the lip which is, of course, flat until raised. The action of the spring so modifies the motion of the walking beam as to adapt it perfectly to my purpose. Since this motion of the vibrating turning tool and its product are novel, and as this motion is an important element of my invention, I do not desire to be limited to the precise means adopted, as the clawing motion might well be accomplished by some other means.

Having described my invention, I claim:—

1. In a machine for turning up two lips previously cut in an insole, a revoluble work-table, a stationary lip-turning tool, a rocking tool holder having a tubular tool supporting head, a vibrating tool vertically-reciprocatingly carried by said tool holder head, a plug seated in the upper end of said head, a collar carried by said vibrating tool, a spring interposed between said plug and said collar, and a revoluble roll having its edge extending over the work-table, said roll feeding the stock and coöperating with said vibrating tool in turning up the two lips and pressing them together.

2. In a machine for turning up two lips previously cut in an insole, a revolving work-table, a stationary lip-turning tool, a vibrating tool provided with a beveled lip-turning surface, means for vertically-yieldingly supporting said vibrating tool, and a revoluble roll having its edge extending over the work-table, said roll feeding the stock and coöperating with said vibrating tool in turning up the two lips and pressing them together.

3. In a machine for turning up and pressing together two lips previously cut in an insole, a revoluble work-table, a revoluble roll having an edge extending over the work-table, means located adjacent to said edge to turn up one lip before it reaches said edge, means located opposite said edge for turning up the other lip and means for imparting vibratory motion to said last named means in substantially a diagonal direction.

4. In a machine for turning up and pressing together two lips previously cut in an insole, a revoluble work-table, a revoluble roll having an edge extending over the work-table, means located adjacent to said edge to turn up one lip before it reaches said edge, means located opposite said edge for turning up the other lip, means for imparting vibratory motion to said last means in substantially a diagonal direction and a spring operating together with said vibratory means to impart a clawing motion to said means.

5. In a machine for turning up and pressing together two lips previously cut in an insole, a revoluble work-table, means for resiliently supporting the table, an oppositely revoluble disk above the table, a means for turning up one lip of the insole located adjacent to the edge of the disk, a vibrating tool to turn up the other lip, located opposite the edge of the disk, and means for resiliently mounting the vibrating tool.

6. In a machine for turning up and pressing together two lips previously cut in an insole, a revoluble work-table, means for resiliently supporting the table, an oppositely revoluble disk above the table, a means for turning up one lip of the insole located adjacent to the edge of the disk, a vibrating walking beam, a tool for turning up the other lip, located opposite the edge of the disk and means for resiliently mounting the tool on one end of the walking beam.

7. In a machine for turning up a lip previously cut in an insole from the inner portion outwardly, comprising a rotatable work supporting table yieldingly longitudinal to its axis, a rotatable feed and anvil roll having an edge extending over the work table, a lip turning and setting tool yieldingly urged transversely against the table and rapidly movable toward and from the periphery of the feed roll, said tool having a forward toe plow portion for raising the lip, and a rear heel hammer portion for forcibly compressing the upturned lip against the periphery of said feed and anvil roll, and means for reciprocating or vibrating said tool.

8. In a machine for turning up and beating a lip previously cut in an insole, the combination of a rotary work support, an overlapping rotary anvil, and a vibratory tool having a hammer portion adjacent the anvil, and a forwardly extending toe portion for raising the lip and guiding it between the anvil and the hammer portion of the tool.

9. In a machine for turning up and beating together two lips previously cut in an insole, the combination of a rotary and yielding work support, a rotary anvil edge overlapping said table, means located advancely adjacent said anvil to turn up one lip, and a vibratory tool having a forwardly extending toe portion for raising the second lip and a hammer portion adjacent said anvil for pressing said lips together between said hammer and anvil.

In witness whereof, I hereunto subscribe my name, as attested by the two subscribing witnesses.

WILLIAM FOWLER.

Witnesses:

OLIVER B. KAISER,

L. A. BECK.